(12) United States Patent
Rhee et al.

(10) Patent No.: US 10,409,324 B2
(45) Date of Patent: Sep. 10, 2019

(54) GLASS-TYPE TERMINAL AND METHOD OF CONTROLLING THE SAME

(71) Applicant: LG ELECTRONICS INC., Seoul (KR)

(72) Inventors: Jeongyoon Rhee, Seoul (KR); Taeseong Kim, Seoul (KR); Yujune Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 247 days.

(21) Appl. No.: 15/315,232

(22) PCT Filed: Oct. 16, 2014

(86) PCT No.: PCT/KR2014/009760
§ 371 (c)(1),
(2) Date: Nov. 30, 2016

(87) PCT Pub. No.: WO2015/199288
PCT Pub. Date: Dec. 30, 2015

(65) Prior Publication Data
US 2017/0199543 A1    Jul. 13, 2017

(30) Foreign Application Priority Data

Jun. 27, 2014 (KR) .......................... 10-2014-0080051

(51) Int. Cl.
*G06F 1/16* (2006.01)
*G02B 27/01* (2006.01)
(Continued)

(52) U.S. Cl.
CPC ......... *G06F 1/1605* (2013.01); *G02B 27/017* (2013.01); *G02B 27/0172* (2013.01);
(Continued)

(58) Field of Classification Search
CPC ........ G06F 1/1605; G06F 3/167; G06F 3/011; G06F 3/013; G06F 3/04817; G06F 3/017;
(Continued)

(56) References Cited

U.S. PATENT DOCUMENTS 6,304,234 B1    10/2001    Horiuchi
2002/0067367 A1    6/2002    Kosugi
(Continued)

FOREIGN PATENT DOCUMENTS

JP    10-240491 A    9/1998
JP    11-265248 A    9/1999

*Primary Examiner* — Abhishek Sarma
(74) *Attorney, Agent, or Firm* — Birch, Stewart, Kolasch & Birch, LLP

(57) ABSTRACT

Disclosed is a glass-type terminal including: a frame portion that is configured to be wearable on the head of a user; a microphone that is combined with the frame portion and into which voice contents are input; a storage unit that is combined with the frame portion and in which at least one piece of schedule information relating to the voice contents are stored; and a controller that, when the voice contents are input into the microphone, analyzes the voice contents being input and extracts the schedule information associated with the analyzed voice contents from the storage unit. Then, in the glass-type terminal, the controller may determine whether or not the extracted schedule information is output, depending on whether or not the extracted schedule information and voice information included in the voice contents being input agree with each other.

13 Claims, 14 Drawing Sheets

(51) Int. Cl.
*G06F 3/01* (2006.01)
*G06F 3/16* (2006.01)
*G10L 15/22* (2006.01)
*G06F 3/0481* (2013.01)

(52) U.S. Cl.
CPC .............. *G06F 3/011* (2013.01); *G06F 3/013* (2013.01); *G06F 3/167* (2013.01); *G10L 15/22* (2013.01); *G02B 2027/014* (2013.01); *G02B 2027/0138* (2013.01); *G02B 2027/0141* (2013.01); *G06F 3/017* (2013.01); *G06F 3/04817* (2013.01); *G06F 2203/0381* (2013.01); *G10L 2015/228* (2013.01)

(58) Field of Classification Search
CPC .............. G06F 2203/0381; G10L 15/22; G10L 2015/228; G02B 27/0172; G02B 27/017; G02B 2027/0141; G02B 2027/0138; G02B 2027/014
See application file for complete search history.

(56) References Cited

U.S. PATENT DOCUMENTS

| | | |
|---|---|---|
| 2007/0220108 A1 | 9/2007 | Whitaker |
| 2013/0187835 A1 | 7/2013 | Vaught et al. |
| 2013/0196757 A1* | 8/2013 | Latta et al. |
| 2014/0337023 A1* | 11/2014 | McCulloch ............. G06F 1/163 704/235 |

* cited by examiner

[Fig. 1]
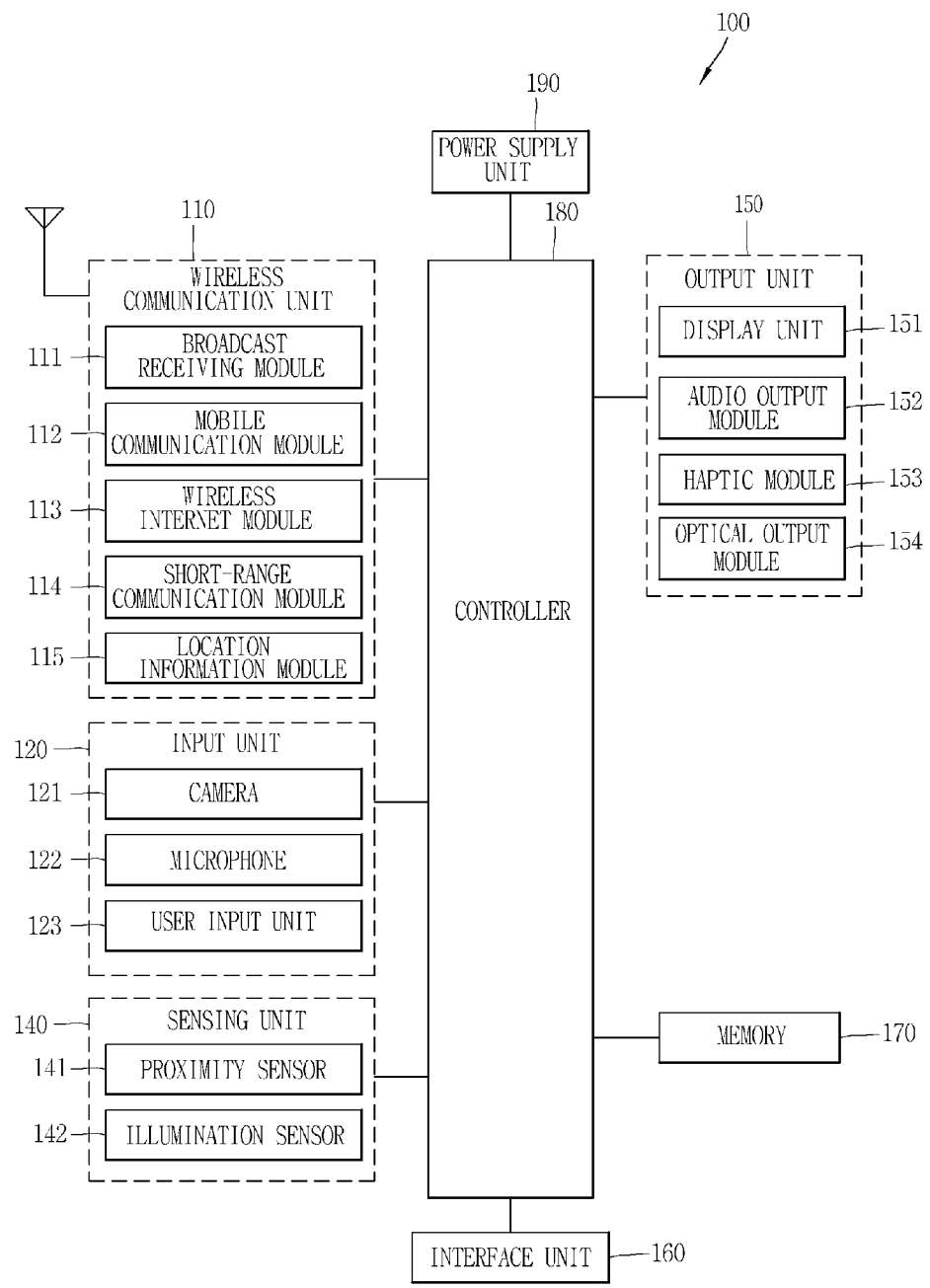

[Fig. 2]
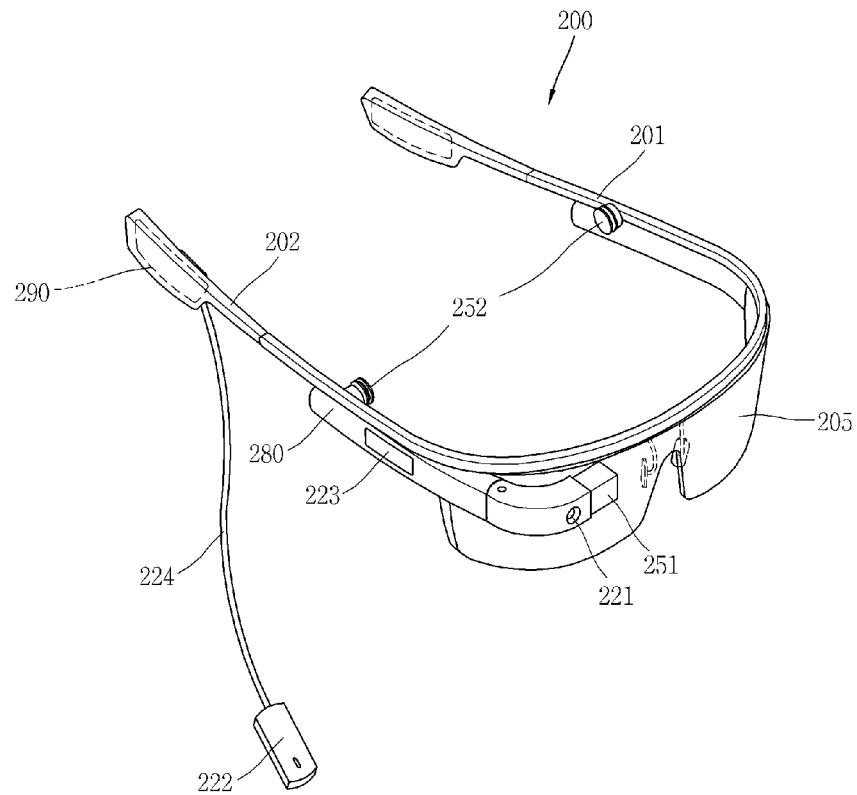
[Fig. 3]
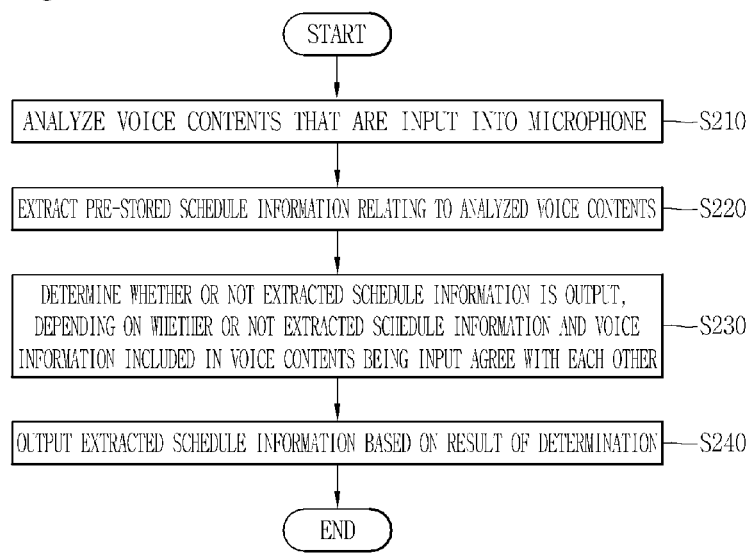

[Fig. 4a]
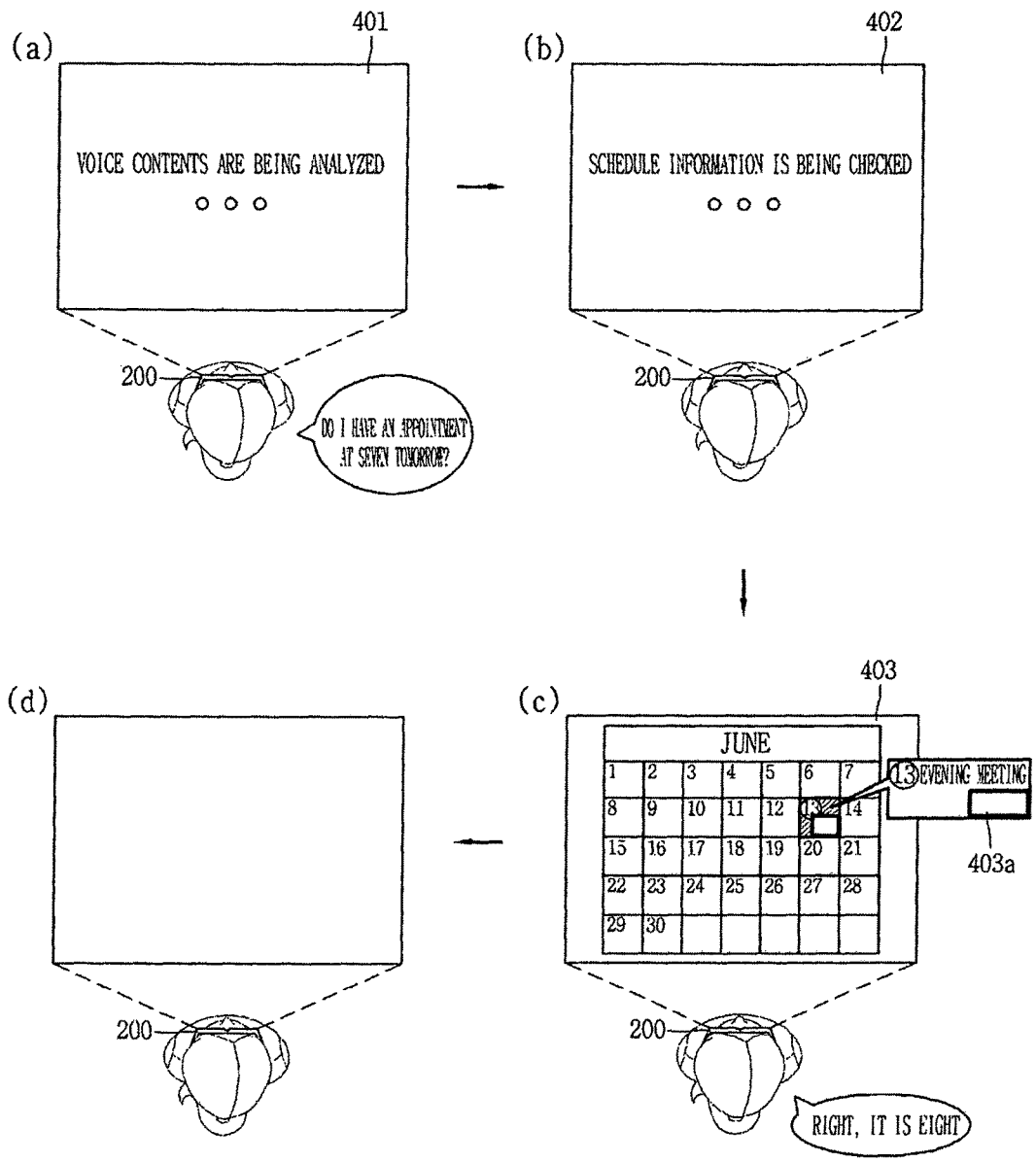

[Fig. 4b]
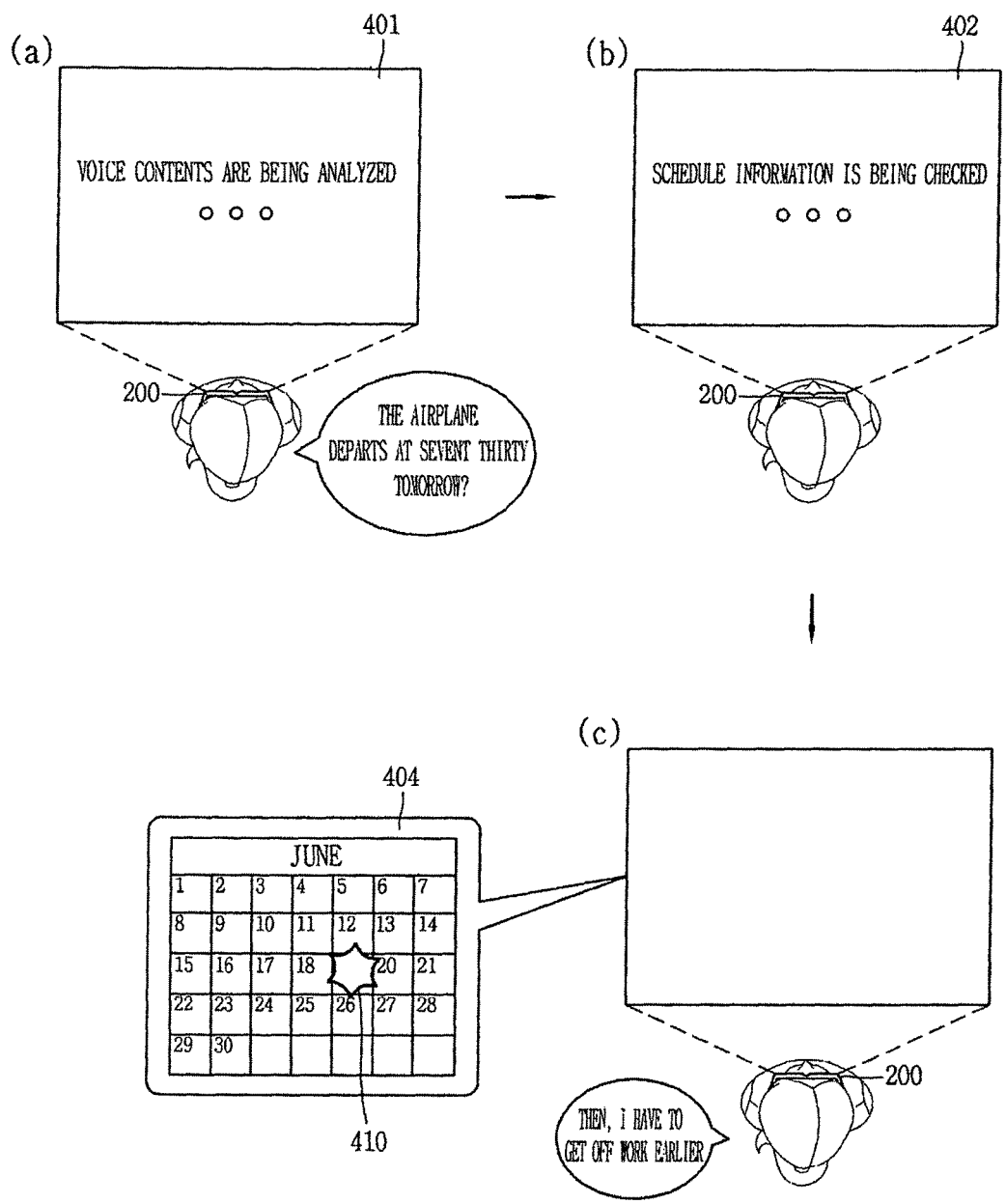

[Fig. 5]
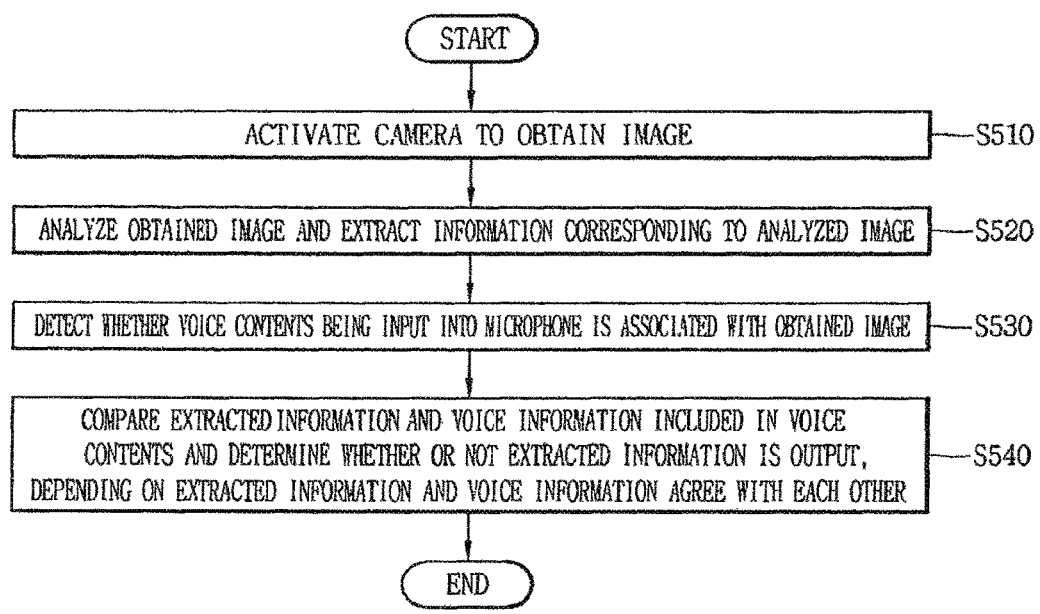

[Fig. 6a]
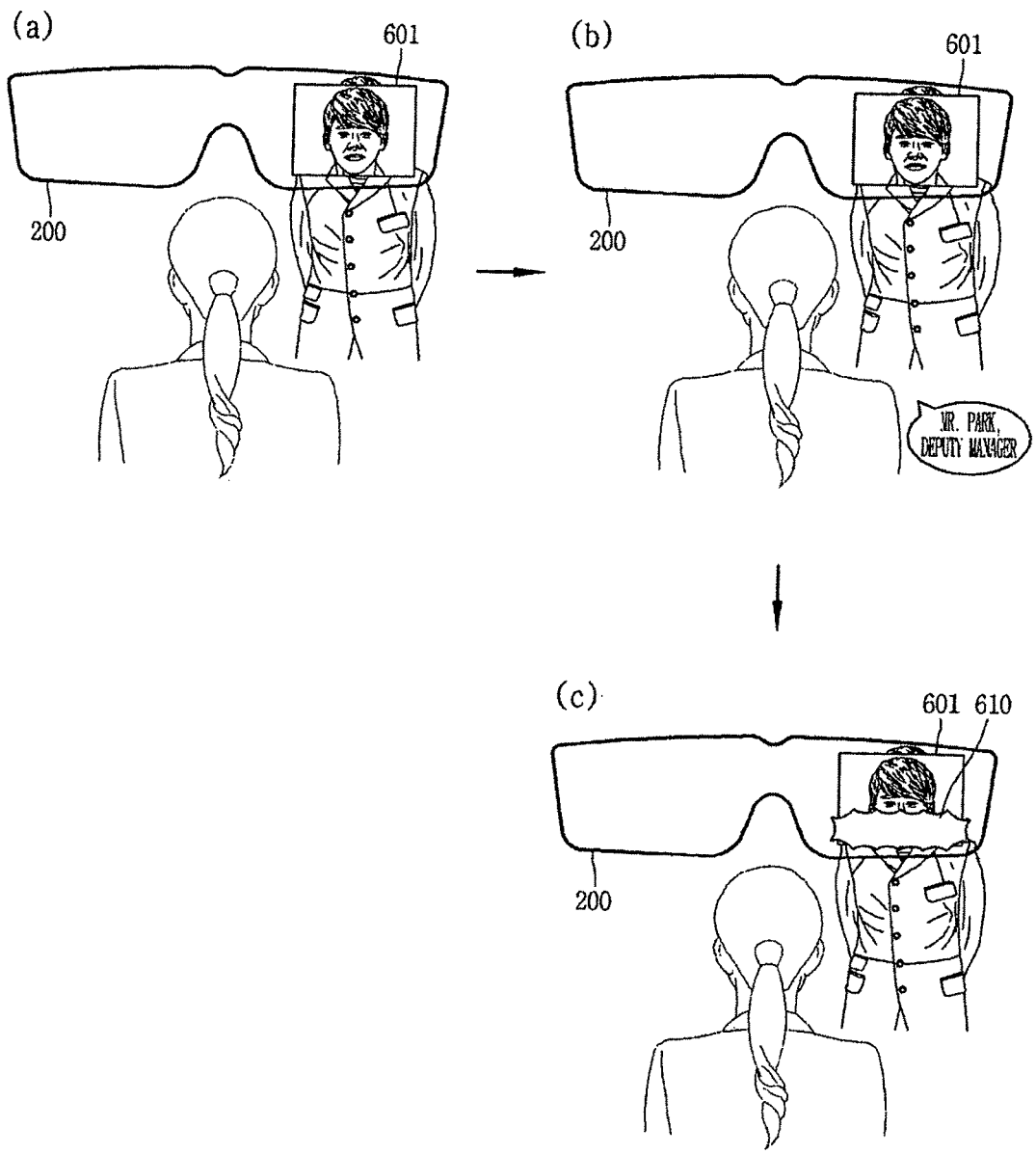

[Fig. 6b]
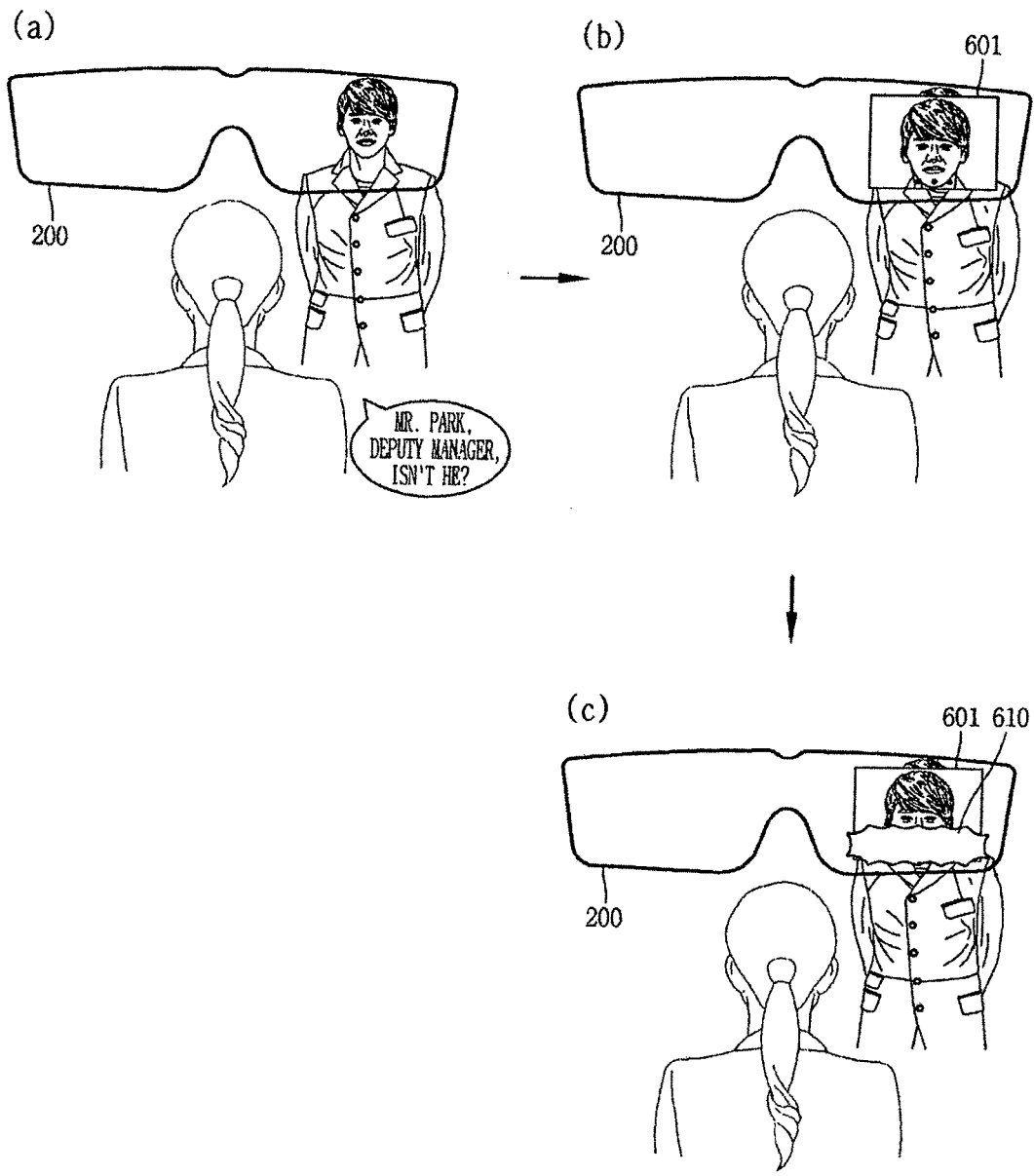

[Fig. 7]
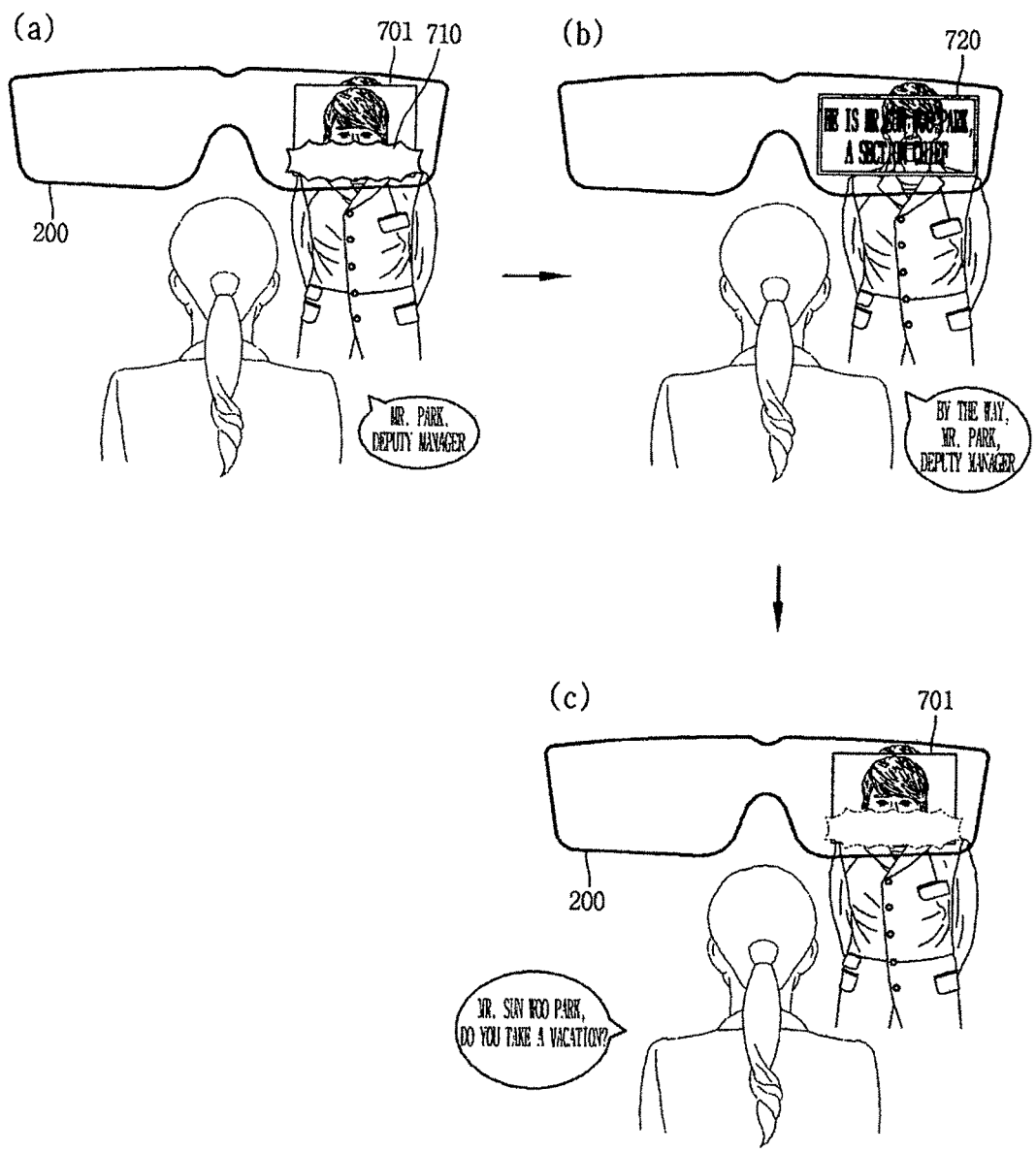

[Fig. 8a]
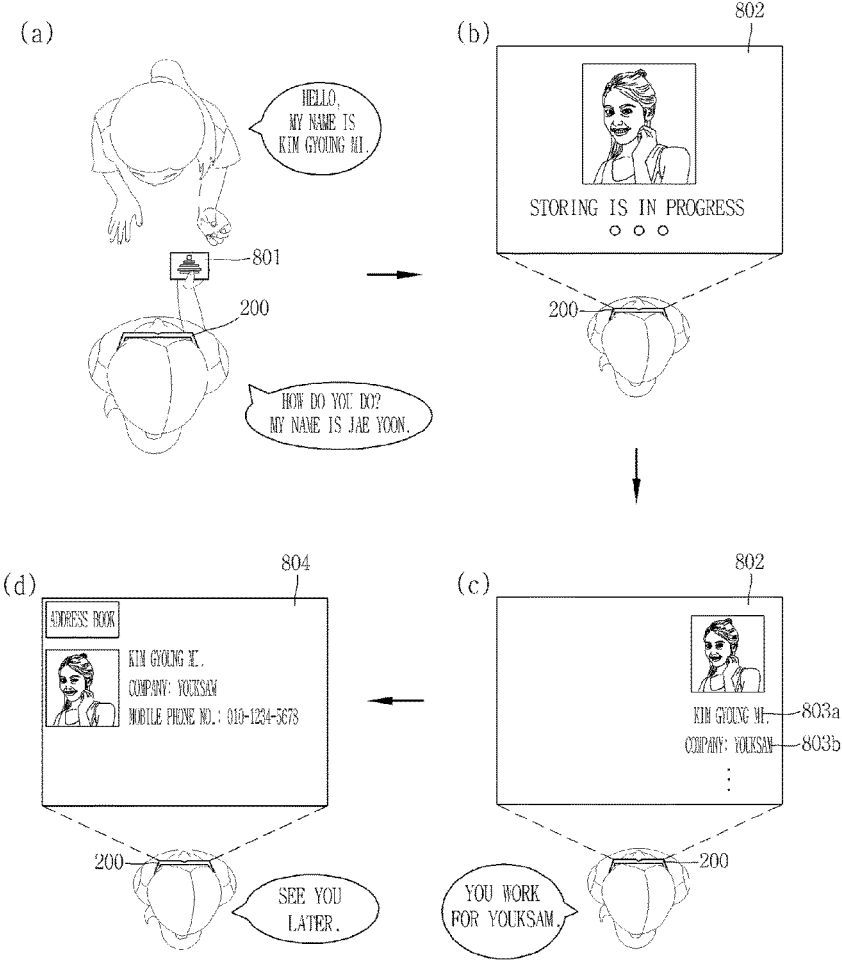
[Fig. 8b]
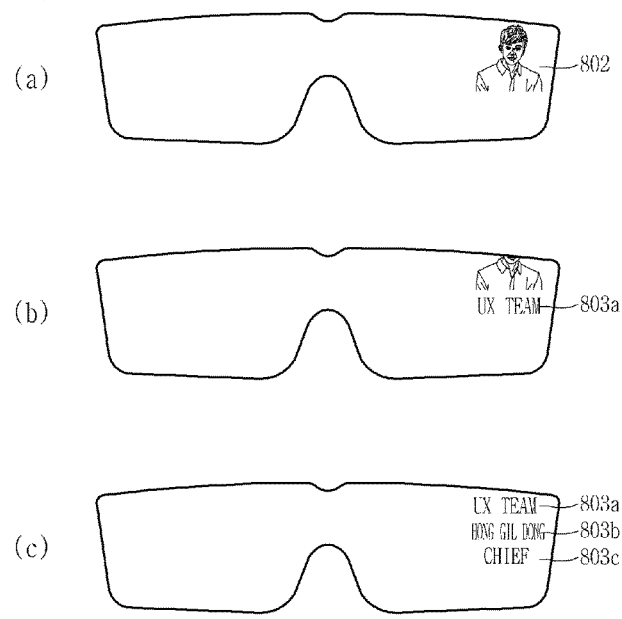

[Fig. 8c]
(a) 
(b) 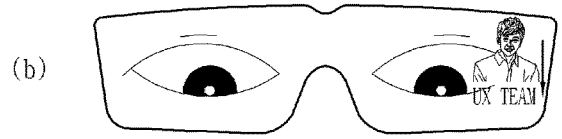
(c) 
[Fig. 9a]
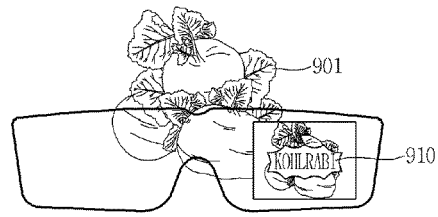
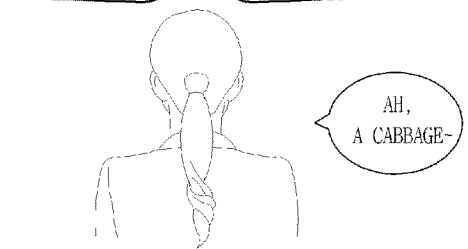
[Fig. 9b]
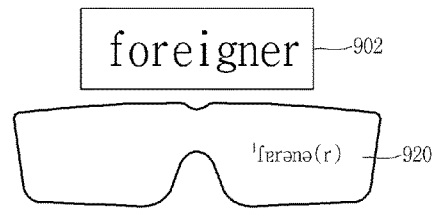
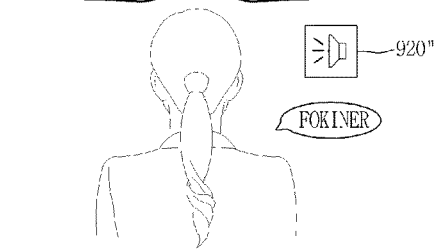

[Fig. 10]
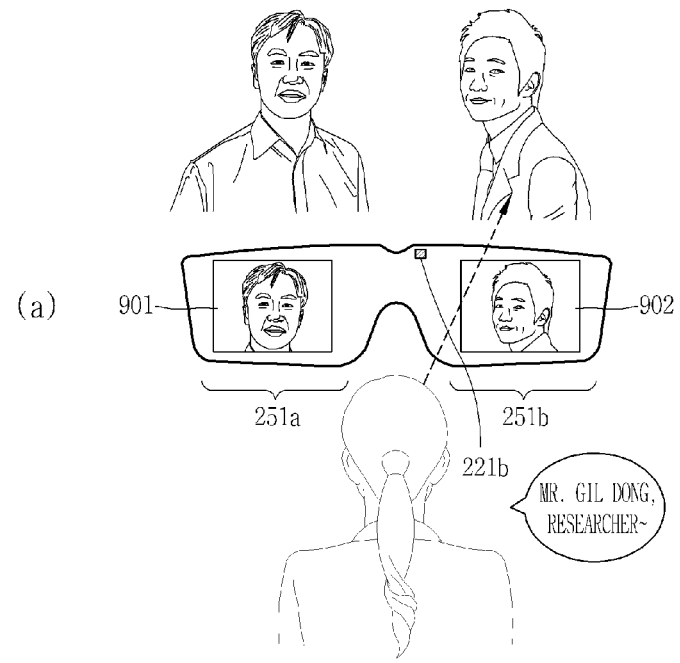
(a)
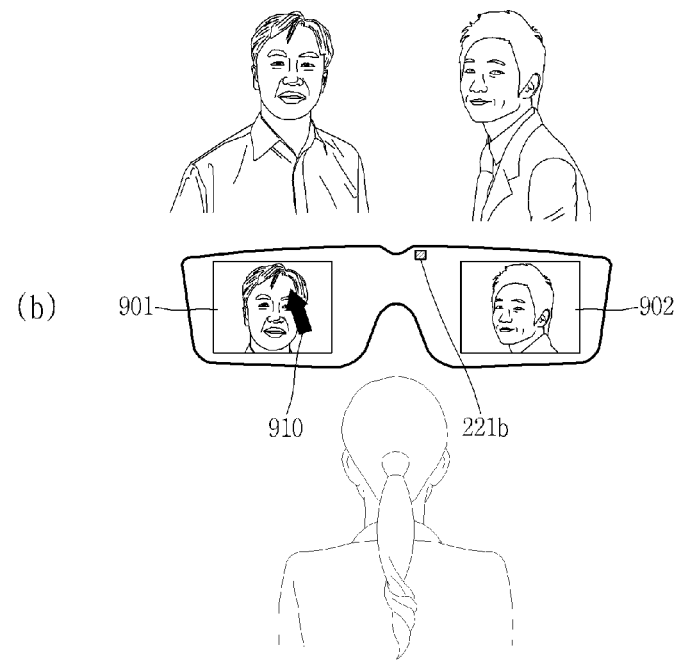
(b)

[Fig. 11a]
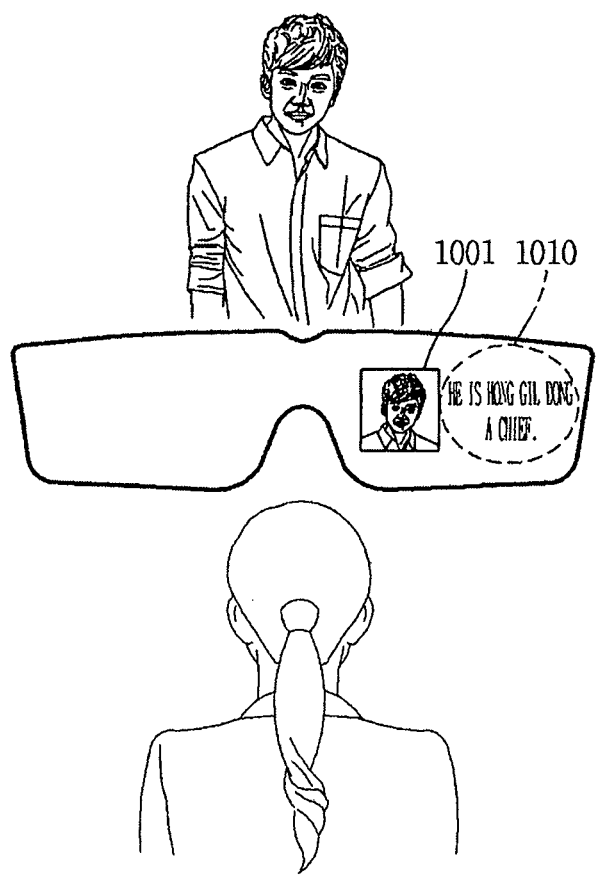

[Fig. 11b]
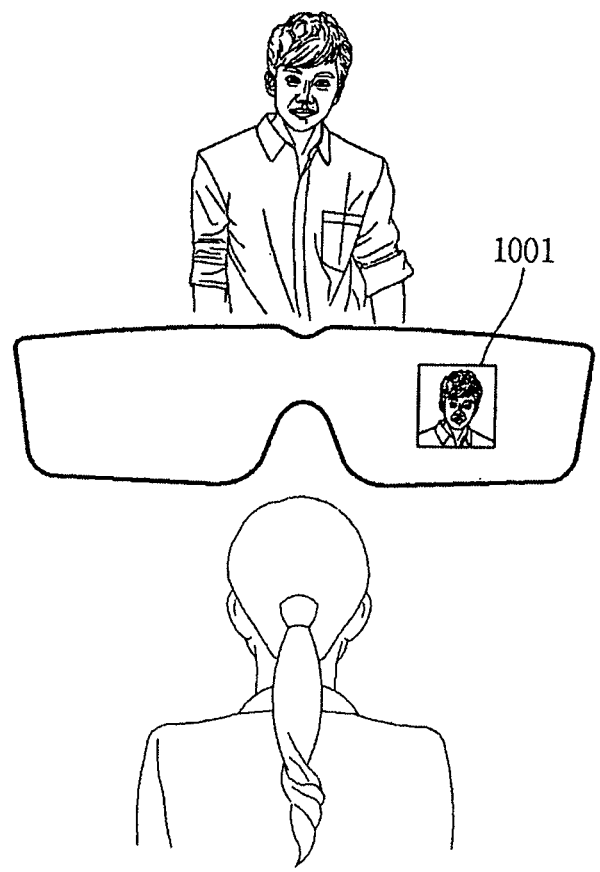

[Fig. 12]
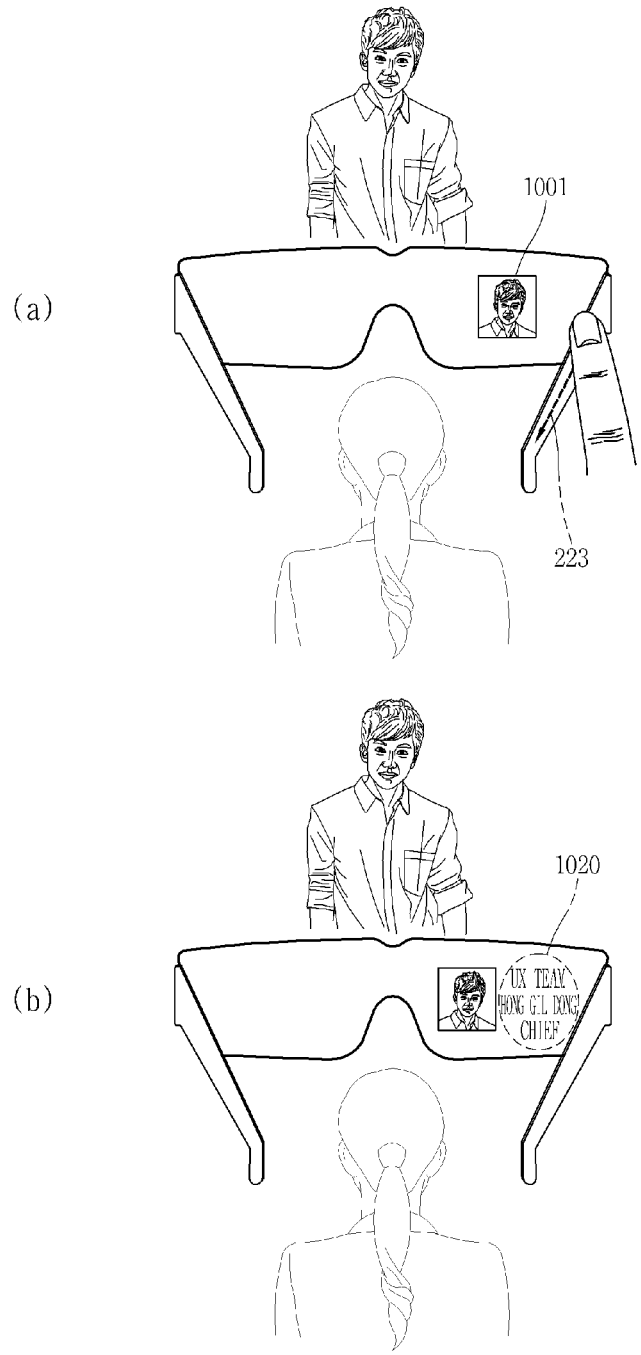

GLASS-TYPE TERMINAL AND METHOD OF CONTROLLING THE SAME

Cross Reference to Related Applications

This application is the National Phase of PCT International Application No. PCT/KR2014/009760, filed on Oct. 16, 2014, which claims priority under 35 U.S.C. 119(a) to Patent Application No. 10-2014-0080051, filed in Republic of Korea on Jun. 27, 2014, all of which are hereby expressly incorporated by reference into the present application.

TECHNICAL FIELD

The present invention relates to a terminal that, like glasses, is configured to be wearable on the head of a user.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In recent years, a mobile terminal has evolved into a wearable device that is wearable on the body of a user, beyond a device that the user can use with holding it with his/her hand. One example of the wearable device is a glass-type terminal.

The glass-type terminal, for example, is worn on the head of a wearer and thus can naturally recognize contents uttered by the wearer or an object that comes into wearer's view.

On the other hand, if the wearer wants to obtain related information during conversation with another person, or if he/she wants to know information relating to the object that comes into his/her view, inputting into the glass-type terminal is performed in advance to search for specific information. However, in some cases, depending on situations, the user has no time sufficient to search for specific information or has difficult performing the inputting. Specifically, if the wearer does not recognize by himself/herself that the uttered content is wrong information, there is a problem in that the wear can be expected to make a request for an information search.

DISCLOSURE OF INVENTION

Solution to Problem

Therefore, an object of the present invention is to provide a glass-type terminal that operates in such a manner that mistakenly-uttered contents are corrected by a user himself/herself when the mistakenly-uttered uttered contents are input, and a method of controlling the glass-type terminal.

Another object of the present invention is to provide a glass-type terminal that is realized in such a manner as to store recognized information by itself depending on situations and a method of controlling the glass-type terminal.

To achieve these and other advantages and in accordance with the purpose of the present invention, as embodied and broadly described herein, there is provided a glass-type terminal including: a frame portion that is configured to be wearable on the head of a user; a microphone that is combined with the frame portion and into which voice contents are input; a storage unit that is combined with the frame portion and in which at least one piece of schedule information relating to the voice contents are stored; and a controller that, when the voice contents are input into the microphone, analyzes the voice contents being input and extracts the schedule information associated with the analyzed voice contents from the storage unit, in which the controller determines whether or not the extracted schedule information is output, depending on whether or not the extracted schedule information and voice information included in the voice contents being input agree with each other.

According to one embodiment, the glass-type terminal may further include a display unit that is combined with the frame portion and that is arranged in such a manner as correspond to at least one of user's left and right eyes, and if the extracted schedule information and the voice information do not agree with each other, the controller may output the extracted schedule information to one region of the display unit.

According to one embodiment, the glass-type terminal may further include a bone conduction speaker that is arranged in such a manner as to correspond to at least one of user's left and right ears, in which if the extracted information and the voice information do not agree with each other, the controller may convert the extracted schedule information into a voice signal and outputs a result of the conversion to the bone conduction speaker.

According to one embodiment, in the glass-type terminal, if the extracted schedule information and the voice information agree with each other, the controller may perform control in such a manner as to display a confirmation mark on a schedule corresponding to the extracted schedule information.

To achieve these and other advantages and in accordance with the purpose of the present invention, as embodied and broadly described herein, there is provided a glass-type terminal including: a frame portion that is configured to be wearable on the head of a user; a microphone into which voice contents are input; a camera that is combined with the frame portion and through which an image is obtained according to an activation signal; a storage unit that is combined with the frame portion and in which information corresponding to the image is stored; and a controller that generates the activation signal and thus analyzes the obtained image and extracts the information corresponding to the analyzed image from the storage unit, in which in response to the voice contents associated with the analyzed image that are input, the controller compares the extracted information and voice information included in the voice contents being input, and determines whether or not the extracted information is output, depending on whether or not the extracted information and voice information included in the voice contents agree with each other.

According to one embodiment, in the glass-type terminal, an information check request may be received by the controller or may be input into the microphone, the activation signal is generated.

According to one embodiment, the glass-type terminal may further include a display unit that is combined with the frame portion and that is arranged in such a manner as correspond to at least one of user's left and right eyes, in which if the extracted schedule information and the voice information do not agree with each other, the controller outputs the extracted information to one region of the display unit.

According to one embodiment, in the glass-type terminal, when in a state where the extracted information is output to the display unit, voice information that agrees with the information being output is input, the controller may cause the information being input to disappear from the display unit.

According to one embodiment, in the glass-type terminal, when an information input request is detected, the controller may generate the activation signal and stores the obtained image in the storage unit, and in response to voice contents associated with the stored image that are input, the controller may convert the voice information corresponding to the stored image included in the voice contents into text and provides a result of the conversion to the storage unit.

According to one embodiment, the glass-type terminal may further include a display unit that is combined with the frame portion and that is arranged in such a manner as correspond to at least one of user's left and right eyes, in which when the information input request is detected, the controller may convert into text at least one portion of the voice information included in the voice contents being input, and may output a result of the conversion, in order of input, to the display unit.

According to one embodiment, in the glass-type terminal, if predetermined voice contents or a predetermined gesture is input, the information input request may be triggered.

According to one embodiment, in the glass-type terminal, the controller may perform control in such a manner that the text-converted voice information disappears from the display unit, when the text-converted voice information being output to the display unit is stored in the storage unit, and may perform control in such a manner that the text-converted voice information moves upward and downward according to a direction of user's gaze.

According to one embodiment, the glass-type terminal may further include a gaze tracking unit that is arranged in such a manner as to correspond to at least one of user's left and right eyes and tracks user's gaze, in which the controller may generate an activation signal and thus obtain an image of an object that is present in a position on which the user's gaze is fixed and extracts information corresponding to the object from the storage unit.

According to one embodiment, the glass-type terminal may further include a display unit that is combined with the frame portion and that is arranged in such a manner as to correspond to at least one of the user's left and right eyes, in which when in a state where the user's gaze is fixed on the object, a predetermined gesture is applied or a predetermined time elapses, the controller may perform control in such a manner that at least one portion of the extracted information is output to one region of the display unit.

According to one embodiment, in the glass-type terminal, according to the activation signal, the camera may obtain an image of a first object that is present in a position on which the user's gaze is fixed and an image of a second image that is present in a position that is out of a range of the user's gaze, the controller may extract the information corresponding to the first object and the information corresponding to the second object from the storage unit, and if in a state where the user's gaze is fixed on the first object, the information corresponding to the extracted second object and the voice information included in the voice contents being into the microphone agrees with each other, the controller may output an icon indicating a position of the second object to one region of the display unit.

According to one embodiment, in the glass-type terminal, the controller may store information on whether or not the extracted information and the voice information included in the voice contents being input agrees with each other, and may determine whether or not the information corresponding to the same image that is obtained through the camera is output, in a different manner based on the information.

To achieve these and other advantages and in accordance with the purpose of the present invention, as embodied and broadly described herein, there is provided a method of operating a glass-type terminal, including: a step of analyzing voice contents being input when the voice contents are input into a microphone; a step of extracting schedule information relating to the analyzed voice contents; a step of determining whether or not the extracted schedule information is output, depending on whether or not the extracted schedule information and voice information included in the voice contents being input agree with each other; and a step of outputting the extracted schedule information based on the determination.

To achieve these and other advantages and in accordance with the purpose of the present invention, as embodied and broadly described herein, there is provided a method of operating a glass-type terminal, including: a step of activating a camera to obtain at least one image; a step of analyzing the obtained image and extracting information corresponding to the analyzed image; and a step of comparing the extracted information and voice information included in voice contents being input, in response to the voice contents associated with the analyzed image that are input and determining whether or not the extracted information, depending on whether or not the extracted information and the voice information agree with each other.

According to one embodiment, in the method, when an information check request is received or the voice contents are input into a microphone, the camera may be activated.

According to one embodiment, the method may further include a step of outputting the extracted information to one region of a display unit based on the determination; and a step of performing control in such a manner that the information being output disappears from the display unit when voice information that agrees with the information being output to the display unit is input.

Advantageous Effects of Invention

As described above, if the mistakenly-uttered contents are input, the glass-type terminal according to the embodiment of the present invention recognizes this and provides the corrected information to the user. Accordingly, not only if he/she recognizes an error in the uttered contents, or but also if he/she does not recognize the wrong information by himself/herself, the wearer is guided through correcting the error. In addition, when the wearer corrects the error, further information is not provided, and thus an effect of providing natural feedback is accomplished.

BRIEF DESCRIPTION OF DRAWINGS

FIG. 1 is a block diagram illustrating a glass-type terminal according to one embodiment of the present invention;

FIG. 2 is a perspective diagram illustrating the glass-type terminal according to one embodiment of the present invention;

FIG. 3 is a flowchart for describing a method of controlling the glass-type terminal according to one embodiment of the present invention;

FIGS. 4A and 4B are diagrams for describing the flowchart in FIG. 3;

FIG. 5 is a flowchart for describing a method of controlling a glass-type terminal according to another embodiment of the present invention:

FIGS. 6A and 6B are diagrams for describing the flowchart in FIG. 5;

FIG. 7 is a diagram for describing a method of changing the corrected information according to the contents uttered by the wearer in the glass-type terminal according to one embodiment of the present invention;

FIGS. 8A to 8C are diagrams for describing a method of storing the contents uttered by the wearer in the glass-type terminal according to one embodiment of the present invention;

FIGS. 9A and 9B are diagrams for describing a method of outputting the corrected information according to recognized information in the glass-type terminal according to one embodiment of the present;

FIG. 10 is a diagram for describing a method of outputting the corrected information according to a direction of user's gaze in the glass-type terminal according to one embodiment of the present invention;

FIGS. 11A and 11B are diagrams for describing a method in which the corrected information is output based on history information, such as wrong information uttered by the wearer in the glass-type terminal according to one embodiment of the present invention; and FIG. 12 is a diagram for describing a method of outputting information relating to a recognized object if voice contents are not input in the glass-type terminal according to one embodiment of the present invention.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

FIG. 1 is a block diagram illustrating the configuration of a glass-type mobile terminal 100 according to an embodiment of the present invention.

Referring to FIG. 1, the glass-type mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the wireless communication unit 110 typically includes one or more modules which permit communications such as wireless communications between the glass-type mobile terminal 100 and a wireless communication system, communications between the glass-type mobile terminal 100 and another glass-type mobile terminal, communications between the glass-type mobile terminal 100 and an external server. Further, the wireless communication unit 110 typically includes one or more modules which connect the glass-type mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The microphone 122 is configured to receive a user's voice, other sound, etc., and to process it into electric voice data. The microphone 122 may be provided at plural regions to receive stereo sounds. If desired, the microphone 122 may include assorted noise removing algorithms to remove unwanted noise generated in the course of receiving the external audio.

The sensing unit 140 is typically implemented using one or more sensors configured to sense internal information of the glass-type mobile terminal, the surrounding environment of the glass-type mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The glass-type mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the glass-type mobile terminal 100 and a user, as well as function as the user input unit 123 which provides an input interface between the glass-type mobile terminal 100 and the user.

The interface unit 160 serves as an interface with various types of external devices that can be coupled to the glass-type mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glass-type mobile terminal 100 may perform assorted control functions associated with a connected external device, in response to the external device being connected to the interface unit 160.

The memory 170 is typically implemented to store data to support various functions or features of the glass-type mobile terminal 100. For instance, the memory 170 may be configured to store application programs executed in the glass-type mobile terminal 100, data or instructions for operations of the glass-type mobile terminal 100, and the like. Some of these application programs may be downloaded from an external server via wireless communication. Other application programs may be installed within the glass-type mobile terminal 100 at time of manufacturing or shipping, which is typically the case for basic functions of the glass-type mobile terminal 100 (for example, receiving a call, placing a call, receiving a message, sending a message, and the like). It is common for application programs to be stored in the memory 170, installed in the glass-type mobile terminal 100, and executed by the controller 180 to perform an operation (or function) for the glass-type mobile terminal 100.

The controller 180 typically functions to control overall operation of the glass-type mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the glass-type mobile terminal 100. The power supply unit 190 may include a battery, and the battery may be configured to be embedded in the terminal body, or configured to be detachable from the terminal body.

At least part of the above components may cooperate with each other, so as to control an operation of a glass-type mobile terminal according to various embodiments to be explained later. A method of controlling a glass-type mobile terminal may be implemented on the glass-type mobile terminal, by driving at least one application program stored in the memory 170.

FIG. 2 is a perspective view illustrating one example of a glass-type mobile terminal 200 according to an exemplary embodiment. The glass-type mobile terminal 200 can be wearable on a head of a human body and provided with a frame 201 (case, housing, etc.) therefor. The frame may be made of a flexible material to be easily worn. The frame of glass-type mobile terminal 200 is shown having a first frame 201 and a second frame 202, which can be made of the same or different materials.

The frame may be supported on the head and defines a space for mounting various components. As illustrated, electronic components, such as a user input unit 223, a controller 280, a power supply unit 290 and an audio output module 252, may be mounted to the frame part. Also, a lens 205 for covering either or both of the left and right eyes may be detachably coupled to the frame part.

The controller 280 controls various electronic components disposed in the glass-type mobile terminal 200. The control module 280 may be understood as a component corresponding to the aforementioned controller 180. FIG. 2 illustrates that the controller 280 is installed in the frame part on one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 may project an image into the user's eye using a prism. Also, the prism may be formed from optically transparent material such that the user can view both the projected image and a general visual field (a range that the user views through the eyes) in front of the user.

In such a manner, the image output through the display unit 251 may be viewed while overlapping with the general visual field. The glass-type mobile terminal 200 may provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing. The camera 221 may be positioned at most any location of the glass-type mobile terminal. In some embodiments, multiple cameras 221 may be utilized. Such multiple cameras 221 may be used to acquire a stereoscopic image.

The glass-type mobile terminal 200 may include the user input unit 223, which can each be manipulated by the user to provide an input. The user input unit 223 may employ techniques which permit input via a tactile input. Typical tactile inputs include a touch, push, or the like. The user input unit 223 is shown operable in a pushing manner and a touching manner as they are located on the frame part and the controller 280, respectively.

If desired, glass-type mobile terminal 200 may include a microphone 222 which processes input sound into electric audio data. The microphone 222 may be detachably mounted to the frame part, through a connector 224 formed of a flexible material. In the drawings, the microphone 222 is mounted to the frame part corresponding to a user's right ear.

The glass-type mobile terminal 200 may include an audio output module 252 for outputting audio. The audio output module 252 may be configured to produce audio in a general audio output manner or an osteoconductive manner. When the audio output module 252 is implemented in the osteoconductive manner, the audio output module 252 may be closely adhered to the head when the user wears the glass-type mobile terminal 200 and vibrate the user's skull to transfer sounds.

When voice contents are input into a microphone, the glass-type terminal 200 according to an embodiment of the present invention, which includes at least one or more constituent elements described above, analyzes the voice contents that are input and compares uttered contents with pre-stored schedule information. When as a result of the comparison, the uttered contents do not agree with the pre-stored schedule information, the glass-type terminal 200 provides the pre-stored schedule information to the user so that he/she can recognize the pre-stored schedule information. In addition, in another example, the uttered contents, which are associated with an object that is recognized through a camera provided in the glass-type terminal, does not agree with pre-stored contents, the glass-type terminal 200 outputs corrected contents of the analyzed voice to a screen or through an audio output module so that he/she can recognize the corrected contents.

FIG. 3 is a flowchart for describing a method of controlling the glass-type terminal according to one embodiment of the present invention. FIGS. 4A and 4B are diagrams for describing the flowchart in FIG. 3.

First, referring to FIG. 3, when the glass-type terminal 200 is worn, voice contents from a user or other persons that are input into the microphone 222 are detected.

To do this, in response to a main body detected as being worn, the glass-type terminal 200 activates operation of the microphone 222 or 252. At this time, the main body is recognized as be worn, for example, when a touch (and/or a proximity touch) is applied to a specific or region of a frame portion, when a biological signal (for example, a change in a temperature of a frame portion) of the user is detected, when a result of analyzing an image obtained through a camera 221 determines that the main body is worn, or and so forth.

In addition, at this point, the activation of the microphone 222 or 252 includes activation of a voice recognition function that is performed on the voice contents that is input into the microphone 222 or 252. The voice recognition function may be automatically activated when the glass-type terminal 200 is worn, or may be activated if a predetermined input is detected.

In addition, if the microphone 222, which is removably mounted to one side of the frame portion, is activated, the voice contents from two or more persons (hereinafter referred to as the user and other persons) can be input into the microphone 222 at the same time. On the other hand, if a bone conduction microphone 252, which is arranged to correspond to left and right ears of the user, is activated, an external noise is removed and only the voice contents from the user who wears the glass-type terminal 200 is input into the microphone 252.

When the voice contents are input into the microphone 222, a controller 280 analyzes the voice contents being input (S210). Accordingly, the controller recognizes the contents uttered by the user or any other person and extracts at least keyword associated with a schedule from the uttered contents.

At this point, the schedule means a series of events including an appointment with a specified person, which the user deals with at a particular time and/or at a particular place. In addition, the keyword associated with the schedule means one or more words (for example, "tomorrow," "10 a.m," "GANG NAM station," and the like) including time information and/or place information, and an ordinary everyday word or phrase (for example, "appointment," "meeting," "I want to see you" and the like).

For example, in FIG. 4A (a), if the user who wears the glass-type terminal 200 utters, "Do I have an appointment at seven tomorrow?, the voice recognition function is activated and thus" the keywords associated with the schedule, such as "tomorrow," "appointment," and "at seven," are extracted from the sentence uttered by the user and it is recognized that the sentence ends with a question mark "?" While the voice recognition function is being executed, as illustrated, a message 401 (for example, "Voice contents are being analyzed . . . ") indicating that the voice recognition function is being executed is output to a display unit 251.

Next, based on the recognized uttered contents, the controller 280 extracts the pre-stored schedule information associated with the analyzed voice contents (S220).

At this time, based on a result of analyzing the recognized uttered contents, the controller 280 determines whether or not the schedule information is extracted. Specifically, if the keywords associated with "schedule," for example, a specific word, phrase, sentence, or the like, are included in the recognized uttered contents, if a predetermined "voice command" is included in the recognized uttered contents, or if the word or sentence that is included in the recognized uttered contents ends with a "question mark," the controller 280 performs control operation in such a manner as to extract the schedule information relating to the recognized uttered contents. In addition, such conditions and the number of combinations of the conditions are set through a user's setting.

At this point, the pre-stored schedule information includes not only information relating to the schedule that the user directly inputs by executing a calendar application, but also information stored in one region of a memory (not illustrated) and information relating to the schedule for the user, which is stored in a database in conjunction with the glass-type terminal 200.

In this manner, while the schedule information relating to the uttered contents is being extracted, as illustrated in FIG. 4A (b), a corresponding message 402 (for example, "The schedule information is being checked . . . ") is output to the display unit 251.

Next, the controller 280 makes a comparison to determine whether or not the extracted schedule information and voice information included in the voice contents that are input into the microphone 222 or 252 agree with each other. It is determined whether or not the extracted schedule information is output, depending on whether or not the extracted schedule information and the voice information agree with each other as a result of the comparison (S230).

For example, if the voice information relating to the schedule included in the contents uttered by the user and the pre-stored schedule information do not agree with each other, it is determined that the extracted information is output, in order for the user to recognize the stored schedule information. On the other hand, if the voice information relating to the schedule included in the contents uttered by the user and the pre-stored schedule information agree with each other. it is determined that the user recognizes the stored schedule information, and thus it is determined that the extracted schedule information is not output.

Next, based on the determination by the controller 280, the extracted schedule is output to the display unit 251 or is output through the audio output module 252 (S240).

At this time, depending on whether or not the voice contents from the user or any other person is currently being input into the microphone 222 or 252, the controller 280 determines whether or not the extracted schedule information is output to the display unit 251 or is output through the audio output module 252. For example, if the user continues to converse with the other party, the controller 280 converts the extracted schedule information into visual information and thus output a result of the conversion to one region of the display unit 251. If the user stops conversing with the other party, the controller 180 converts the extracted schedule information into a voice signal and thus outputs a result of the conversion through the audio output module 252.

For example, if as a result of checking the schedule information in FIG. 4A (b), the contents ("Do I have an appointment at seven thirty?") uttered by the user and the schedule information ("an appointment at eight p.m tomorrow") stored in the calendar application do not agree with each other, pre-stored schedule information (for example, a calendar screen) 403, as illustrated in FIG. 4A(c), is output to the display unit 251. The entire calendar screen is output, as the extracted schedule information, in the drawings. However, in another example, a corrected portion (for example, "at eight, not at seven") of the schedule information, which corresponds to a portion of the contents uttered by the user that does not agree with the pre-stored schedule information, may be output to the screen.

A highlighting effect (for example, marking for emphasis, blinking, or a change in color or size) is output to a portion 403a of the schedule information that the user mistakenly recognizes. In such a state, when the user utters contents (for example, "Right, it is eight") confirming the schedule information that is output), the schedule information that is output, as illustrated in FIG. 4A(d), disappears from the display unit 251.

On the other hand, if the schedule information extracted in Step S230 and the voice information included in the contents uttered by the user agree with each other, the controller 180 performs control in such a manner as to display a confirmation mark on schedule information corresponding to the extracted schedule information.

For example, in FIG. 4B (a) to 4B (c), if the wearer of the glass-type terminal 200 utters "The airplane departs at seven tomorrow, doesn't it?" (in FIG. 4B(a)), it is recognized that the keyword associated with the schedule is present in the uttered contents, and the corresponding schedule information (for example, tomorrow schedule information) (in FIG. 4B(b)) is checked. Then, it is determined that the user knows the tomorrow schedule correctly, and thus no visual information is output to the display unit 251 (in FIG. 4B(c)). At this time, the controller 280 performs control in such a manner that the calendar application corresponding to the extracted schedule information is executed in the background (404), and an icon 410 indicating that the tomorrow schedule information is checked is output.

As described above, according to the embodiment of the present invention, if the uttered contents that do not agree with the pre-stored schedule information are input, the glass-type terminal recognizes this and thus provides corrected information to the user. Accordingly, the schedule is checked in a natural manner through the contents uttered by the user and this helps the user remedy his mistake.

On the other hand, there is a limitation in the extraction of the related information that depends on only the contents uttered by the user. Accordingly, referring to FIGS. 5, 6A(a) to 6A(c), and 6B(a) to 6B(c), a method is described in detail below in which if wrong information is uttered, corrected information is provided by recognizing an object at which the user gazes.

To do this, the glass-type terminal 200 according to the embodiment of the invention recognizes the object at which the user gazes using at least one camera 221. At this point, an image that is obtained through the camera 221 is an image of a scene at which the user gazes, among images of a surrounding area that is viewed in real time through a preview screen of the camera.

Referring to FIG. 5, first, when the glass-type terminal 200 is worn, the camera 221 provided in the glass-type terminal 200 is activated to obtain at least one image (S510).

At this point, when the glass-type terminal 200 is detected as being worn, the activation of the camera is automatically performed. For example, referring to FIG. 6A, when the glass-type terminal 200 is worn, the camera 221 is activated to obtain a facial image of the third party that is viewed through a preview screen 601. In this case, in order to minimize power consumption, an image that is displayed on the preview screen 601 is output in black and white.

In addition, the activation of the camera 221 is performed if an information check request is received from the user or a condition for inputting the voice contents into the microphone 222 or 252 is satisfied. For example, referring to FIG. 6B, even though the glass-type terminal 200 is first worn, the camera 221 is not activated, but is activated if the voice contents from the user or any other person, for example, an interrogative sentence "He is Mr. Park, a deputy manager, isn't he?" are input. In this case, before recognizing the scene at which the user gazes, the voice recognition function is activated to store the voice contents from the user that are input, the resulting recognized voice contents voice are converted into text and a result of the conversion is output to the display unit 251. Next, the controller 280 of the glass-type terminal 200 proceeds with a step of analyzing the obtained image and extracting information corresponding to the analyzed image (S520). At this point, a range of information corresponding to the analyzed image varies according to a type of obtained image.

For example, if the obtained image is the face of a specific person, the controller 280 automatically executes a face recognition function to analyze the image. When the face recognition function is executed in this manner, information on a facial contour or on a skin tone, or distinctive-feature information (for example, a length, a position, an angle, or a shape) on a part of a person's face, such as an eye, a nose, a mouth, an eyebrow, or an ear is detected from the obtained image. Then, a comparison is made to determine whether or not the face recognized based on the detected information agrees with a facial image stored on a phone book, an address book, or the like of the glass-type terminal 200. When as a result, the recognized face agrees with the stored facial image, at least one piece of information, such as a name, a telephone number, an address, an occupation, a position title, or the like is extracted along with the stored facial image. For example, the facial image of the third party is analyzed on the preview screen 601 illustrated in FIGS. 6A(a) and 6B(b) and thus corresponding information is detected from the phone book or the address book on which the facial images are stored.

In addition, for example, if the obtained image is a specific object, the controller 280 detects the distinctive-feature information (contour, size, color, or the like) on the corresponding object and thus extracts information relating to the same object as found through a web search and the like.

On the other hand, if multiple images are obtained through the camera 221, the controller 280 specifies at least one image based on a result of detecting whether or not the voice contents is associated with the obtained image in subsequent Step S530. For example, when multiple objects such as a "flower," a "true," and a "person," are included in the obtained one image and the voice contents from the user such as "Is it a flower called a morning glory?" into the microphone 222 or 252, the controller 280 specifies a "flower" image in the obtained image.

In this case, the controller 280 extracts only information relating to a specified partial image (the "flower" image).

Then, the controller 280 detects whether or not the voice contents that are input into the microphone is associated with the obtained image (S530).

Specifically, the controller 280 detects only the uttered contents associated with the obtained image, from the voice contents that are input into the microphone 222 or 252, and ignores the uttered contents never associated with the obtained image. For example, if the user who wears the glass-type terminal 200 places a call while on the move, when contents of telephone conversation between the user and the other party have nothing to do with images that are viewed on the preview screen, no operation is performed.

On the other hand, in this manner, if the voice contents that are input into the microphone 222 or 252 is associated with the obtained image, the controller 280 recognizes that a specific event occurred.

In this manner, if the specific event occurred, the controller 280 compares the information extracted in Step S520 and the voice information included in the voice contents that are input into the microphone 222 or 252. As a result of the comparison, the controller 280 determines whether or not the extracted information is output, depending on whether or not the extracted information and the voice information being input into the microphone agree with each other (S540).

Specifically, if the extracted information and the voice information included in the voice contents that are input into the microphone 222 or 252 do not agree with each other, the information corresponding to the extracted image is output and thus the user is guided through correcting the contents uttered by him/her. On the other hand, if the extracted information and the voice information included in the voice contents that are input into the microphone 222 or 252 agree with each other, no information is output. Accordingly, the displaying on the display unit 251 is minimized and the user is provided with a feedback on whether or not there is an error in the contents uttered by him/her.

If it is determined that the extracted information is output, the controller 280 outputs the information corresponding to the obtained image to one region of the display unit 251.

For example, if the contents uttered by the user is "Mr. Park, a deputy manager," or "He is Mr. Park, a deputy manager," in FIGS. 6A(b) and 6B(a), when this uttered contents do not agree with actual information corresponding to an obtained image 601, "Mr. Sun Woo Park, a section chief" indicating information 610 corresponding to the obtained image 601 is output to one region of the display unit 251, for example, a lower region of the facial image. The user recognizes that there is an error in the uttered contents, by viewing the contents that are output to the display unit 251.

At this time, the controller 280 processes the extracted information and thus output the processed information to the display unit 251. For example, the controller 280 processes the extracted information in such a manner that the user recognizes a portion of the voice information included in the voice contents that are input into the microphone 222 or 252, which does not agree with the extracted information. For example, text information, such as "He is Mr. Park, a section chief, not Mr. Park, a deputy manager," is output to one region of the display unit 251 in FIG. 6A(c) or 6B(c). At this time, a highlighting effect, for example, a change in color or size for emphasis appears on a text portion to be corrected, that is, "Mr. Park, a section chief."

In this manner, in a state where the corrected information is output to the display unit 251, the controller 280 continues to perform monitoring to check whether or not the voice information that is input into the microphone 222 or 252 agrees with the information that is output to the display unit 251.

As a result, if the user utters contents with the corrected information being included, that is, if the voice information that agrees with the information being output to the display unit 251 is input, the controller 280 performs control in such a manner that the information being output to the display unit 251 disappears. The user can see that the information being output to the display unit 251 disappears and thus can recognize that the wrong contents are properly corrected. Accordingly, the user is provided with a feedback on the uttered contents in a natural manner.

In addition, as an example, the corrected information is described above as being output to the display unit 251, but the corrected information, of course, is output through the audio output module 252 that is of a bone conduction type. In this case, the controller 280 performs control in such a manner that only any one of a microphone function and a speaker function of the audio output module 280, operates. That is, a predetermined switch (not illustrated) is provided in order to prevent the microphone function and the speaker function from malfunctioning due to an echo phenomenon. According to a switching signal corresponding to a predetermined input, the controller 280 performs control in such a manner that when the microphone function is on, the speaker function is off, and when the speaker function is on, the microphone function is off.

On the other hand, FIG. 7 illustrates examples in which in a state where the corrected information is output to the display unit 251, the corrected information is changed differently according to the uttered contents uttered by the wearer.

As described above, when it is recognized that the contents uttered by the user, associated with the image that is obtained through the camera 221, is wrong, the corrected information is output to the display unit 251, is output through the audio output module 252 or the like. Then, when the user checks the information being output and then the user utters contents with the corrected information being included, it is recognized that no further correction is necessary and thus the information being output disappears.

On the other hand, when in a state where the corrected information is output to the display unit 251, the wearer utters contents that does agree with the corrected information, successively or at time intervals, the controller 280 outputs an emphasizing effect to the corrected information or provides the corrected information in conjunction with a different output unit (for example, the audio output module).

For example, when in a state where the corrected information ("Mr. Sun Woo Park, a section chief"), as illustrated in FIG. 7(*a*), is output to the display unit 251, the user, as illustrated in FIG. 7(*b*), utters wrong contents again (for example, "By the way, Mr. Park, a deputy manager"), the text information ("Mr. Sun Woo Park, a section chief") is more enlarged and the emphasizing effect (boldface) appears on characters. In addition, such history is stored in the glass-type terminal 200, and thereafter is used in determining a display state of the corrected information.

When in a state where the corrected information, as illustrated in FIG. 7(*b*), is output in an emphasized manner, the user corrects the uttered contents to achieve the corrected information (for example, "Mr. Park, section chief. Do you take a vacation?"), the information being output, as illustrated in FIG. 7(*c*), disappears from the display unit 251.

The examples are described above in which the stored information is extracted based on the contents uttered by the user. Referring to FIGS. 8A to 8C, a method is described below in which the related information is collected and stored based on the contents uttered by the user.

To do this, the glass-type terminal 200 activates the camera 221 in order to recognize a scene at which the user gazes.

Next, when an information input request is detected, the controller 180 stores in a storage unit (not illustrated) an image that is obtained according to a camera activation signal. At this point, the information input request is triggered if predetermined voice contents or a predetermined gesture is input.

For example, the information input request is triggered if the voice information (for example, "How do you do?" "Nice to meet you," "What's your name, please," or the like) relating to introduction is input, if a gesture (for example, an act of shaking hands, or an act of presenting a business card) relating to introduction is made, or if a predetermined input (a touch input on one region of the frame portion, an act of lifting the frame portion, an act of pressing a nose-supported region of the frame portion, or the like) is applied.

For example, if as illustrated in FIG. 8A (*a*), a scene in which the user presents his/her name card to the other party is recognized through the camera and then the voice information (for example, "How do you do. My name is Jae Yoon") is input, a facial image 802 of the other party that is output to the preview screen, as illustrated in FIG. 8A (*b*), is stored.

At this time, the controller 280 outputs guide information to the display unit 251 in such a manner that an image to be stored is guided toward the center of the preview screen. For example, the guide information is output in the form of a focusing box to a central region of the preview screen. In addition, if one portion of the image to be stored falls out of a viewing angle range, the guide information includes information indicating a direction in which the user's head moves.

Next, in response to the voice contents associated with the stored image that are input into the microphone 222 or 252, the controller 280 converts into text the voice information corresponding to the stored image, of the voice contents being input, and stores the text in the storage unit (not illustrated).

The voice contents associated with the stored image includes not only the voice contents from the user, but also the voice information (for example, "How do you do? My name is Kim Gyoung Mi") that is uttered by the other party to the conversation with the user. In addition, the utter contents not associated with the stored image, of the voice contents that are input, are ignored.

Then, the controller 280 outputs text information to be stored to the display unit 251 in order in which the corresponding pieces of voice information are collected, in such a manner that the user can check the text information to be stored. The text information is processed in a manner that is suitable for a field for storage and the processed text information is output to the display unit 251.

For example, as illustrated in FIG. 8A (*c*), text corresponding to the voice information associated with the stored facial image 802 is output line by line to one region of the display unit 251, for example, a lower region of the facial image. At this time, the fields for storage are changed, the corresponding text items are displayed on different lines, respectively. The different lines are displayed in different colors in a manner that is distinguished from one another. In addition, for example, for displaying, the different lines are adjusted to lengths (for example, "Kim Gyoung Mi," "Company: Youksam") that are suitable for the fields in which pieces of text information 803*a* and 803*b* corresponding to the stored facial image 802 are stored.

In this manner, each of pieces of information that are output line by line to the display unit 251 disappears from the display unit 251 each time the text information is stored in the storage unit. For example, referring to FIG. 8B, according to the passage of time, the facial image 802, team information (for example, a "UX team") 803*a*, name information (for example, "Hong, Gil Dong") 803*b*, and title information (for example, "chief") 803*c* on the other party, which are output to the display unit 251, are displayed in order in which they are uttered, and then moves line by line upward and finally disappear from the display unit 251.

At this time, the controller 280 performs control in such a manner that the pieces of information moved upward and downward according to a direction of user's gaze. To do this, a second camera 221*b* detecting the user's gaze is arranged within the frame portion.

In this case, as illustrated in FIG. 8C, the pieces of information that is output to the display unit 251 are scrolled upward and downward according to the direction of the user's gaze. For example, when the user's gaze moves in an upward direction as illustrated in FIG. 8C (a), the pieces of information move fast in an upward direction. In addition, for example, when the user's gaze moves in a downward direction as illustrated FIG. 8C (b), the pieces of information move fast in a downward direction. At this time, a speed at which the pieces of information are scrolled is determined in proportion to a speed at which the user's gaze moves and an amount of information that is output.

On the other hand, the controller 280 detects a signal for terminating the inputting of the information. At this point, the signal for terminating the inputting of the information is triggered if predetermined voice contents are input, or if a predetermined gesture is made. For example, the signal for terminating the inputting of the information is triggered if the voice information (for example, "See you later, "Goodbye," "Nice talking with you," "We should always keep in touch," and so forth) relating to farewell is input, or if a predetermined input (a touch input on one region of the frame portion) is applied.

In this manner, when the signal for terminating the inputting of the information, the controller 280, as illustrated in FIG. 8A (d), switch a current screen to a screen such as a screen for a phone book, an address book, or the like on which a lot of information are stored. At this time, pieces of information that are output to the screen are arranged in the order suitable for a format of the phone book or the address book, and then are stored. That is, the order in which the pieces of information are output to the display unit 251 may not be not consistent with the order in which the pieces of information are finally stored in the storage unit (not illustrated). The user can finally check whether or not pieces of information (for example, a name, information on the company, and a mobile phone number) corresponding to the uttered contents are properly input.

FIGS. 9A and 9B are diagrams for describing different methods of providing corrected information according to recognized information in the glass-type terminal according to one embodiment of the present invention. Here, according to one embodiment, an example is described in which a process for correcting the uttered contents is triggered if the voice contents from the user are input.

First, the voice contents (for example, "Ah! a cabbage") from the user are input into the microphone, the voice contents are converted into text, and a result of the conversion output to the display unit 251. Then, in order to check the result of the conversion, the glass-type terminal 200 applies an activation signal to the camera. Accordingly, an image 901 that is obtained through the camera is analyzed to detect the corresponding information. At this time, the detected corresponding information may be information that is pre-stored in the glass-type terminal 200 or may be information that is detected through a web search. When the information that is detected in this manner does not agree with the text information (which results from converting the voice information that is input into the microphone), the controller 280, as illustrated in FIG. 9A, displays corrected information (for example, "Kohlrabi") 910 on the display unit 251 instead of the information that is input into the microphone). If the information uttered by the user and the corrected information are sequentially output to the display unit 251, the user can intuitively recognize what portion of the uttered contents is wrong. In addition, the glass-type terminal 200 displays an associated image (for example, "Kohlrabi food") or a different image (for example, a "cabbage image") corresponding to the mistakenly-uttered information on the display unit 251, in such a manner that the user can reliably recognize the wrong portion of the uttered contents.

On the other hand, according to a type of the information to be corrected, the controller 280 guides the user through correcting the information through the audio output module 252. For example, if as illustrated in FIG. 9B, a text image 902 that is recognized through the camera is in a foreign language and the user wrongly pronounces the text image 902 in a foreign language into the microphone (for example, "fokiner"), visual information 902 associated with foreign phonetic symbols is output to the display unit 251 and the corresponding foreign phonetic symbols are output through the audio output module 252.

FIG. 10 is a diagram for describing a method of outputting the corrected information according to the direction of the user's gaze in the glass-type terminal according to one embodiment of the present invention.

To do this, the glass-type terminal 200 according to one embodiment of the present invention is combined with the frame portion and is arranged in such a manner as to correspond to at least one of the left and right eyes of the user. The glass-type terminal 200 includes a gaze tracking unit that tracks the user's gaze. At this point, the gaze tracking unit is configured from the second camera 221b provided on the inside of the frame and an infrared light sensor (not illustrated) arranged adjacent to the second camera 221b. In addition, the first camera 221 is activated according to a first activation signal, and the second camera 221b is activated according to a second activation signal. Here, descriptions are provided under the assumption that if the first activation signal and the second activation signal are not particularly distinguished from each other, an activation signal includes all of the first and second activation signals.

When the glass-type terminal 200 is worn, the activation signal is generated and thus an image of an object that is present in a position on which the user's gaze is fixed is obtained. At this time, a region indicator or an alerting icon that indicates the position on which the user's gaze is fixed is displayed on one region of the display unit 251, in such a manner that the user can check the obtained image of the object.

Then, the controller 280 analyzes the obtained image of the object and extracts the corresponding information. Then, when the voice contents that are input into the microphone 222 or 252 are associated with the image of the object and it is determined that the voice contents do not agree with the extracted information, the controller 280 outputs the extracted information to one region of the display unit 251 along the obtained image of the object. Accordingly, the user himself/herself is guided through correcting the wrong-input information on the object at which the user looks with interest.

On the other hand, if the user remembers no information relating to the object of interest, the controller 280 recognizes this situation and thus output related information to the display unit 251.

Specifically, when in a state where the user's gaze is fixed on a specific object, a predetermined gesture is applied or a predetermined time elapses, the controller 280 performs control in such a manner that at least one portion of the information relating to the object is output to one region of the display unit 151.

According to the embodiment of the present invention, as another example, if multiple objects are present within the viewing angle range, according to the activation signal, the first camera 221 and the second camera 221b are activated at the same time and this it is possible to obtain multiple images, that is, a first image and a second image. At this point, the obtained first image is an image of a first object that is present in the position on which the user's gaze is fixed, and the obtained second image is an image of a second object that is present in a position that is out of a range of the user's gaze.

When the multiple images are obtained in this manner, the controller 280 extracts information corresponding to the obtained first image and information corresponding to the obtained second image from the storage unit or through the web search. The pieces of information are temporarily stored associated with the obtained images, respectively.

In addition, the controller 280 detects that the voice contents associated with the obtained first image or second image are input into the microphone 222 or 252.

Next, the controller 280 determines whether the voice contents being input is associated with the first image, that is, the object that is present in the position on which the user's gaze is fixed, or is associated with the second image, that is, the object that is present in the position that is out of the user's gaze range.

Based on a result of the determination, the controller 280 determines whether or not the pieces of extracted information are output or whether or not an image associated with the uttered contents is displayed.

First, when the contents uttered by the user is associated with the first image, it is determined whether or not the uttered contents agree with the information corresponding to the extracted first image and thus it is determined only whether or not information corresponding to the extracted first image is output. As another example, when the contents uttered by the user are not associated with the first and second images, the pieces of extracted information of the user are not output.

As another example, when the contents uttered by the user is not associated with the first image, but is associated with the second image, an indicator that indicates the second image associated with the uttered contents is output to the display unit 251 along with the information corresponding to the extracted second image.

Specifically, if in a state where the user's gaze is fixed on the first object, the information corresponding to the extracted second image and the voice information included in the voice contents that are input into the microphone agree with each other, the controller 280 outputs an icon indicating a position of the second object to one region of the display unit 251.

For example, if the user is engaged in a conversation with multiple persons, a first facial image and a second facial image that correspond to positions of the multiple persons, respectively are output in such a manner as to correspond to regions for the left and right eyes, of the display unit 251, respectively. For example, a first facial image 901 is displayed on a left-side display region 251*a*, and a second facial image 902 is displayed on a right-side display region 251*b*.

If in this state, it is determined that the voice contents (for example, "Mr. Gil Dong, a researcher") that the user utters while fixing his/her gaze on the right-side display region 251*b* on which the second facial image is displayed is information corresponding the first facial image 901, not information corresponding to the second facial image 902, the controller 280, as illustrated in FIG. 10B, outputs an alerting icon (for example, an arrow icon) 910, which indicates that the voice contents are information associated with the first facial image, to the left-side display region 251*a* on which the first facial image 901 is displayed.

Accordingly, the displaying on the display unit 251 is minimized and the user intuitively recognizes that contents uttered by the user are wrong.

On the other hand, a history of the wrong contents that the user utters with respect to the recognized image is output to one region of the display unit 251.

FIGS. 11A and 11B illustrates an example of a method in which the corrected information is output based on history information, such as the wrong information uttered by the wearer in the glass-type terminal according to one embodiment of the present invention.

To do this, the controller 280 stores information on whether or not the extracted information and the voice contents being input into the microphone 222 or 252 agree with each other, for example, pieces of history information, such as the number of times that the extracted information and the voice contents or the voice information does not agree with each other, and the extent to which the extracted information and the voice contents or the voice information agree with each other, and the wrong information.

When the history information is stored, the controller 280 determines whether or not the information corresponding to the same image that is obtained through the camera thereafter is output, in a different manner based on the stored history information. In addition, the history information is updated or learned by the controller 280.

FIG. 11A illustrates an example in which if the user has uttered the wrong information previously with respect to the facial image being output to the display unit 251, the corrected information (for example, "He is Hong, Gil Dong, a chief") is displayed on the display unit 261. Even though no voice information is input into the microphone 222 or 252, it is ensured that the corrected information is output.

Then, it is apparent from FIG. 11B that if the user has not uttered the wrong information previously with respect to the facial image being output to the display unit 251, or if the facial image has not been recognized previously, no information is output before the voice information is input into the microphone 222 or 252.

FIG. 12 illustrates an example in which information relating to an object that is recognized if the voice contents are not input is output in the glass-type terminal according to one embodiment of the present invention.

The controller 280 recognizes a facial image of the third party that is viewed on the preview screen that is output to the display unit 251. At this time, if the user wants to obtain information relating to the recognized facial image, he/she can apply a predetermined touch input (for example, a drag touch input) to one side of the frame portion, on which a touch sensor is provided, as illustrated in FIG. 12.

If the touch sensor detects the touch input in this manner, the controller 280 extracts the information corresponding to the recognized information and displays the extracted information to one region of the display unit 251, for example, a lower region of the image being output.

At this time, the controller 280 performs a control operation in such a manner that an amount of information to be output varies according to a distance that the touch input applied to the touch sensor is dragged or a force with which the touch input is applied to the touch sensor. For example, the amount of information to be output is determined in proportion to the distance that the touch input is dragged or the force with which the touch input is applied. In addition, when a predetermined touch input is detected, the controller 280 outputs the related information while moving the related information line by line upward from bottom or downward from top in order in which the pieces of related information are stored in the storage unit, or in order of predetermined preference (for example, the importance of the information corresponding to a current position of the glass-type terminal).

As described above, if the mistakenly-uttered contents are input, the glass-type terminal according to the embodiment of the present invention recognizes this and provides the corrected information to the user. Accordingly, not only if he/she recognizes an error in the uttered contents, or but also if he/she does not recognize the wrong information by himself/herself, the wearer is guided through correcting the error. In addition, when the wearer corrects the error, further information is not provided, and thus an effect of providing natural feedback is accomplished.

The configuration and the method of the embodiments according to the present invention, described above, are not applied in a limiting manner, but all of or some of the embodiments may be selectively combined with each other to create various modifications to the embodiments.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A glass-type terminal comprising:
    a frame portion configured to be wearable on the head of a user;
    a microphone;
    a camera combined with the frame portion;
    a storage unit combined with the frame portion and in which information corresponding to the image is stored; and
    a controller configured to:
    control the camera to obtain an image when a predetermined type of voice contents is input via the microphone,
    analyze the image obtained via the camera and extract information corresponding to the image from the storage unit based on the analyzation,
    when the voice contents are associated with the image, compare the extracted information and voice information included in the voice contents being input, and
    determine whether or not the extracted information is output, depending on whether or not the extracted information and voice information included in the voice contents agree with each other,
    wherein if the extracted information and the voice information included in the voice contents do not agree with each other, control a display unit to display at least part of the extracted information corresponding to the image.

2. The glass-type terminal of claim 1, wherein the display unit
    is combined with the frame portion and is arranged to correspond to at least one of the user's left and right eyes, and
    wherein if the extracted information and the voice information do not agree with each other, the controller outputs the extracted information to one region of the display unit.

3. The glass-type terminal according to claim 2, wherein when the at least part of the extracted information is output to the display unit, and voice information that agrees with the at least part of the extracted information being output is input, the controller causes the at least part of the extracted information being output to disappear from the display unit.

4. The glass-type terminal of claim 1, wherein when an information input request is detected, the controller controls the camera to be activated and stores the image in the storage unit, and
    wherein in response to voice contents associated with the image that are input, the controller converts the voice information corresponding to the image included in the voice contents into text and provides a result of the conversion to the storage unit.

5. The glass-type terminal of claim 4,
    wherein when the information input request is detected, the controller converts into text at least one portion of the voice information included in the voice contents being input, and outputs a result of the conversion, in order of input, to the display unit.

6. The glass-type terminal of claim 5, wherein if predetermined voice contents or a predetermined gesture is input, the information input request is triggered.

7. The glass-type terminal of claim 5, wherein the controller performs control so the text-converted voice information disappears from the display unit, when the text-converted voice information being output to the display unit is stored in the storage unit, and performs control so the text-converted voice information moves upward and downward according to a direction of user's gaze.

8. The glass-type terminal of claim 1, further comprising:
    a gaze tracking unit arranged to correspond to at least one of the user's left and right eyes and track the user's gaze,
    wherein the controller generates an activation signal and obtains an image of an object that is present in a position on which the user's gaze is fixed and extracts information corresponding to the object from the storage unit.

9. The glass-type terminal of claim 8,
    wherein when the user's gaze is fixed on the object, a predetermined gesture is applied or a predetermined time elapses, the controller performs control so at least one portion of the extracted information is output to one region of the display unit.

10. The glass-type terminal of claim 8, wherein according to the activation signal, the camera obtains an image of a first object that is present in a position on which the user's gaze is fixed and an image of a second image that is present in a position that is out of a range of the user's gaze, and
    wherein the controller extracts the information corresponding to the first object and the information corresponding to the second object from the storage unit, and when the user's gaze is fixed on the first object, the information corresponding to the extracted second object and the voice information included in the voice contents being into the microphone agree with each other, the controller outputs an icon indicating a position of the second object to one region of the display unit.

11. The glass-type terminal of claim 1, wherein the controller stores information on whether or not the extracted information and the voice information included in the voice contents being input agree with each other, and determines whether or not the information corresponding to the same image that is obtained through the camera is output, in a different manner based on the information.

12. The method of claim 10, further comprising:
    when the at least part of the extracted information is output to the display unit, and voice information that agrees with the at least part of the extracted information being output is input, the at least part of the extracted information being output disappears from the display unit.

13. A method of operating a glass-type terminal, the method comprising:
controlling, via a controller, a camera to obtain an image when a predetermined type of voice contents is input via a microphone;
analyzing, via the controller, the image obtained via the camera and extract information corresponding to the image from a storage unit based on the analyzation;
when the voice contents is associated with the image, comparing the extracted information and voice information included in the voice contents being input; and
determining whether or not the extracted information is output, depending on whether or not the extracted information and voice information included in the voice contents agree with each other,
wherein if the extracted information and the voice information included in the voice contents do not agree with each other, at least part of the extracted information corresponding to the image is displayed on a display unit.

* * * * *